(12) United States Patent
Fechte-Heinen et al.

(10) Patent No.: US 9,458,717 B2
(45) Date of Patent: Oct. 4, 2016

(54) CONNECTION MEANS WITH SHAPE MEMORY

(71) Applicant: ThyssenKrupp Steel Europe AG, Duisburg (DE)

(72) Inventors: Rainer Fechte-Heinen, Bottrop (DE); Lothar Patberg, Moers (DE); Joseph Georg Kevenhörster, Bochum (DE); Andreas Cott, Waltershausen (DE); Thomas Flaskamp, Duisburg (DE); Vanessa Wieschalla, Essen (DE); Erik Hilfrich, Dusseldorf (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 14/654,784

(22) PCT Filed: Dec. 19, 2013

(86) PCT No.: PCT/EP2013/077475
§ 371 (c)(1),
(2) Date: Jun. 22, 2015

(87) PCT Pub. No.: WO2014/096247
PCT Pub. Date: Jun. 26, 2014

(65) Prior Publication Data
US 2015/0337659 A1 Nov. 26, 2015

(30) Foreign Application Priority Data

Dec. 21, 2012 (DE) .......................... 10 2012 113 053

(51) Int. Cl.
*E21D 21/00* (2006.01)
*E02D 5/80* (2006.01)
(Continued)

(52) U.S. Cl.
CPC ........... *E21D 21/0006* (2013.01); *C22C 38/04* (2013.01); *E02D 5/80* (2013.01);
(Continued)

(58) Field of Classification Search
CPC .............. E21D 20/00; E21D 21/0006; E21D 21/0026; E21D 21/0033; E21D 21/004; E21D 21/0066; E21D 21/0073; E21D 21/008; E21D 21/0086
See application file for complete search history.

(56) References Cited

U.S. PATENT DOCUMENTS 2,930,199 A * 3/1960 Jarund .................. E21D 20/021
405/259.5
3,389,561 A * 6/1968 Taylor .................. E21D 20/021
138/144
(Continued)

FOREIGN PATENT DOCUMENTS

DE 2615572 A1 10/1976
DE 60107606 T2 5/2005
(Continued)

*Primary Examiner* — Frederick L Lagman
(74) *Attorney, Agent, or Firm* — The Webb Law Firm (57) ABSTRACT

A connector is disclosed for providing a positive and/or a non-positive connection between at least two connecting partners. The connector or connecting means has at least one first region which engages with the first connecting partner by way of a positive and/or a non-positive connection, and at least one second region is provided which engages with the at least second connecting partner by way of a positive and/or a non-positive connection. The connecting means provides a positive and/or non-positive connection between at least two connecting partners in a simple and inexpensive manner and which meets high safety requirements. The second region of the connecting means has a region which is formed from an at least partially flat material made of an Fe alloy with shape memory characteristics and which, when activated, ensures the positive and/or non-positive connection with the second connecting partner by way of a change in shape.

11 Claims, 5 Drawing Sheets

(51) Int. Cl.
*C22C 38/04* (2006.01)
*E21B 17/04* (2006.01)
*F16B 1/00* (2006.01)
*F16B 13/06* (2006.01)

(52) U.S. Cl.
CPC ............. *E02D 5/801* (2013.01); *E02D 5/805* (2013.01); *E21B 17/04* (2013.01); *E21D 21/004* (2013.01); *E21D 21/0026* (2013.01); *E21D 21/0033* (2013.01); *E21D 21/0086* (2013.01); *E21D 21/0093* (2013.01); *F16B 1/0014* (2013.01); *F16B 13/063* (2013.01)

(56) References Cited

U.S. PATENT DOCUMENTS

| | | | |
|---|---|---|---|
| 4,195,952 A | | 4/1980 | Swanson |
| 5,637,158 A | * | 6/1997 | Arnold ................ B22F 5/00 148/220 |
| 5,851,481 A | * | 12/1998 | Stankus .............. E21D 21/0006 148/320 |
| 6,524,406 B2 | * | 2/2003 | Kikuchi ................ C21D 6/005 148/402 |
| 2008/0253830 A1 | * | 10/2008 | Katsuki ................ B28D 1/041 403/24 |
| 2015/0043976 A1 | * | 2/2015 | Defossez ............ E21D 21/0013 405/259.5 |
| 2015/0218797 A1 | * | 8/2015 | Scherer ................ C22C 38/02 52/704 |

FOREIGN PATENT DOCUMENTS

| | | | | |
|---|---|---|---|---|
| EP | 1888878 A1 | | 2/2008 | |
| GB | 2323387 A | * | 9/1998 | ............ C22C 38/32 |
| JP | 3148000 A | | 6/1991 | |
| JP | 06065921 A | * | 3/1994 | |
| SU | 1332029 A1 | | 8/1987 | |
| SU | 1454976 A1 | | 1/1989 | |
| WO | 2006130889 A1 | | 12/2006 | |

* cited by examiner

CONNECTION MEANS WITH SHAPE MEMORY

CROSS-REFERENCE TO RELATED APPLICATIONS

This application is the United States national phase of International Application No. PCT/EP2013/077475 filed Dec. 19, 2013, and claims priority to German Patent Application No. 10 2012 113 053.1 filed Dec. 21, 2012, the disclosures of which are hereby incorporated in their entirety by reference.

BACKGROUND OF THE INVENTION

1. Field of the Invention

The invention relates to a connecting means for providing a positive and/or a non-positive connection between at least two connecting partners, wherein the connecting means has at least one first region which engages with the first connecting partner by way of a positive and/or a non-positive engagement, and at least one second region is provided which engages with the at least second connecting partner by way of a positive and/or a non-positive engagement.

2. Description of Related Art

To connect two connecting partners, connecting means are used which provide a permanent connection between the connecting partners commonly by way of positive and/or non-positive connections. Examples of these are screw connections, plugs etc. Connecting means may however also be used for connecting two components for example in the construction sector in order to fasten tunnel linings to the ground or to rock or to connect different layers thereof. Such connecting means are then referred to as rock anchors or rock bolts. Corresponding connections are often exposed to environmental influences, for example temperature fluctuations, load peaks, vibrations etc., which the connections must withstand without damage being caused to the connection or to the component. It is often also necessary for the connecting means to be exchanged after several years of use. The installation and dismounting of corresponding connecting means has hitherto been very difficult, in particular if the connecting means have to accommodate high loads, such as for example rock anchors in a tunnel lining. For example, the U.S. Pat. No. 4,195,952 has disclosed rock anchors which are inserted into a bore in the rock and which have a conically narrowing internal thread. A non-positive connection of the rock anchor in the rock is provided by means of a screw which, during the counterboring process, spreads the conical internal thread outward. A disadvantage of this solution is that, firstly, a cumbersome screwing process has to be performed, which furthermore harbors the risk that the screw in the threaded shank itself fractures owing to the forces acting. A rock layer bolt which utilizes shape memory characteristics of a material is known for example from the Russian patent application SU 1332029 A. The shape of the rock layer bolt is however highly complex and requires very high production costs. The safety strut known from the Russian patent application SU 1454976 A has securing means which likewise utilize a material with shape memory characteristics. For the provision of connecting means which provide a highly loadable positive and/or non-positive connection between two connecting partners, the known safety strut however has a non-positive or frictional engagement region which is too small. The provision of a large non-positive or frictional engagement region does not appear to be possible with the known safety strut.

SUMMARY OF THE INVENTION

Taking this as a starting point, it is the object of the present invention to provide a connecting means with which a non-positive and/or positive connection between at least two connecting partners can be provided in a simple and inexpensive manner and which meets high safety requirements.

According to the teaching of the present invention, the stated object is achieved in that at least the second region of the connecting means has a region which is formed from an at least partially flat material with shape memory characteristics and which, when activated, ensures the positive and/or non-positive connection with the second connecting partner by way of a change in shape.

In the present case, an at least regionally flat or preferably flat material composed of an iron alloy with shape memory characteristics is to be understood to mean a material which, in the initial state, is at least regionally flat and which is brought into the shaped state by way of cold forming, for example. In the shaped, for example rolled and/or bent state, the material with shape memory characteristics can be activated for example by heating, such that, owing to the shape memory characteristics, the material attempts to resume its flat initial position again. Thus, as a result of the activation, the material provided in the second region of the connecting means increases in diameter, thus making possible to realize a non-positive and/or a positive connection with the second connecting partner. As material with shape memory characteristics, there is provided, at least in parts, a shape memory alloy composed of an iron alloy. Specifically, iron-based shape memory alloys can provide relatively high non-positive or positive connection forces and have relatively high activation temperatures.

For example, as shape memory alloys, use may be made of iron-manganese-silicon-based shape memory alloys, iron-manganese-silicon-chromium-based shape memory alloys or iron-manganese-silicon-chromium-nickel-based shape memory alloys. The iron systems mentioned can even be used in mass production, as they are relatively inexpensive in relation to other alloy systems. Furthermore, iron-based systems offer the possibility of ensuring the activation of the shape memory characteristics by way of efficient inductive heating, such that the activation is realized in a particularly simple manner. Other iron-based alloys not specifically mentioned above have similar properties.

In a further embodiment of the connecting means according to the invention, the shape memory alloy comprises, aside from iron and inevitable impurities, the following alloy elements in wt %:

$12\% \leq Mn \leq 45\%$, $1\% \leq Si \leq 10\%$, $Cr \leq 20\%$, $Ni \leq 20\%$, $Mo \leq 20\%$, $Cu \leq 20\%$, $Co \leq 20\%$, $Al \leq 10\%$, Mg≤10%,

V≤2%,

Ti≤2%,

Nb≤2%,

W≤2%,

C≤1%,

N≤1%,

P≤0.3%,

Zr≤0.3%,

B≤0.01%.

A corresponding alloy system can be very well adapted to the specific strength characteristics through the selection of different alloy components. For example, strength is considerably increased with the addition of carbon, chromium, molybdenum, titanium, niobium or vanadium.

The addition of manganese, carbon, chromium or nickel stabilizes the austenite phase, which can be utilized to increase the activation temperature; a combination of at least in each case one element from the groups vanadium, titanium, niobium, tungsten on the one hand and at least in each case one element from the groups carbon, nitrogen, boron on the other hand leads to the formation of precipitates in the microstructure, and thus to the simplification or elimination of the thermomechanical material treatment.

In a further exemplary embodiment of the connecting means according to the invention, a pseudoplastic or a pseudoelastic shape memory alloy can be provided if the shape memory alloy comprises, aside from iron and inevitable impurities, the following alloy elements in wt %:

25%≤Mn≤32%,

3%≤Si≤8%,

3%≤Cr≤6%,

Ni≤3%,

C≤0.07%, preferably 0.01%≤C≤0.07%, and/or

N≤0.07%, preferably 0.01%≤N≤0.07%, 0.1%≤Ti≤1.5% or 0.1%≤Nb≤1.5% or 0.1%≤W≤1.5% or 0.1%≤V≤1.5%.

In a further embodiment, the connecting means may advantageously be configured such that, in the first region of the connecting means, there are provided positive connecting means for forming a positive connection with the first connecting partner. As positive connecting means, use is for example simply made of punched projections, if the connecting means is for example a rock anchor. Said projections may for example be cohesively connected to the first region of the connecting means.

In a further embodiment of the connecting means, the positive connecting means are detachably connected to the first region of the connecting means, wherein optionally, in the first region of the connecting means, there is provided a thread for the detachable fastening of the positive connecting means. The first and the second region of the connecting means may be in one piece, wherein preferably, the thread may be shrink-fitted onto the first region of the connecting means. Another possibility is for threads to be formed in by mechanical means, for example by embossing. It is furthermore also possible for the thread to be provided by virtue of a threaded sleeve being shrink-fitted on. As positive connecting means, use may then be made, as in the case of a rock anchor, for example, of a plate which has an opening through which the thread of the connecting means is passed, and the plate is secured by means of a nut.

A non-positive and/or a positive connection with the second connecting partner can be realized in a particularly simple manner if the second region has a shaped metal sheet with a longitudinal slot and composed of a shape memory alloy. The shaped metal sheet with the longitudinal slot may for example form the anchor bar of a rock anchor, which can then be inserted into a bore such that, when the shape memory of the shaped metal sheet is activated, said shaped metal sheet greatly increases in diameter and provides a non-positive and/or positive connection with the rock or the layers thereof in the bore.

To further improve the retention forces of a correspondingly designed connecting means, it is possible, in a further embodiment of the connecting means, for the shaped metal sheet to be at least partially slotted in the transverse direction, and optionally have a tip generated as a result of the cutting of the metal sheet. By means of the transverse slots provided in the shaped metal sheet, the metal sheet is divided into different sectors in the longitudinal direction, which sectors can be enlarged in a varying manner when activated. In this way, the positive and/or non-positive connection, for example of a rock anchor in a bore which has diameter fluctuations, can be considerably improved. As a result of the division into segments, the connecting means can adapt much more easily to the second connecting partner, for example to the geometry of the provided bore.

If the shaped metal sheet preferably has a tip generated as a result of the cutting of the metal sheet, said tip may simultaneously be used, for example if the second connecting partner is composed of a relatively soft material, for the driving of the connecting means into the second connecting partner.

In a further embodiment, the second region of the connecting means, opposite the first region of the connecting means, has an end in the form of a cutting tip or drilling head. It is made possible in this way for the connecting means to simultaneously be used for the drilling of holes in the second connecting partner, such that the connecting means can simultaneously be a drill and connecting means. The drilling characteristics of the connecting means can be further improved if the shaped metal sheet of the second region at least partially has profilings for discharging material.

In a further embodiment of the connecting means according to the invention, the second region of the connecting means has a longitudinally slotted shaped metal sheet composed of a shape memory alloy. The longitudinally slotted metal sheet can, upon activation, in particular in soft ground, lead to a fanning-out of the slotted metal sheet lugs, such that the embodiment can be classed for example as a ground fastening anchor. The activation of the connecting means may also preferably be realized by way of inductive and thus highly efficient heating, that is to say iron-manganese-silicon, iron-manganese-silicon-chromium or iron-manganese-silicon-chromium-nickel. Activation by way of an exothermic chemical reaction is alternatively possible.

In a further embodiment of the connecting means, the longitudinal slots of the metal sheet are of triangular form, wherein the metal sheet is cold-formed to form a conical tip. The conical tip can in turn be utilized for the driving of the connecting means into the second connecting partner, in order to then, upon activation, realize an anchor function by virtue of the remaining individual triangular lugs of the metal sheet composed of a shape memory alloy being spread outward.

The connecting means is particularly advantageous if the connecting means is a rock anchor, a rock bolt, an excavation support, a plug, a fixing and installation anchor, or a ground fastening anchor. All of these connecting means have in common the fact that, firstly, the provision of the positive and/or non-positive connection, for example in the tunnel construction sector, is particularly cumbersome owing to the multiplicity of rock anchors that are used, such that simple activation, such as is possible with the connecting means according to the invention, permits a considerable reduction in costs. Furthermore, they are, in relation to conventional systems, better suited to withstanding vibrations, subsidence and adverse environmental conditions.

Furthermore, in the case of the connecting means according to the invention, in the usage situation mentioned above, it is possible, by way of the two-way memory effect of shape memory alloys, for the rock anchors to be designed to be releasable, for example, by virtue of said rock anchors, for example, being subjected to a particularly low temperature such that the activation state can be reversed. In this case, the positive and/or non-positive connection with the second connecting partner can be released again, and the connecting means can be easily exchanged.

BRIEF DESCRIPTION OF THE DRAWINGS

The invention will be discussed in more detail below on the basis of exemplary embodiments in conjunction with the drawing, in which.

DESCRIPTION OF THE INVENTION

Figure 1:
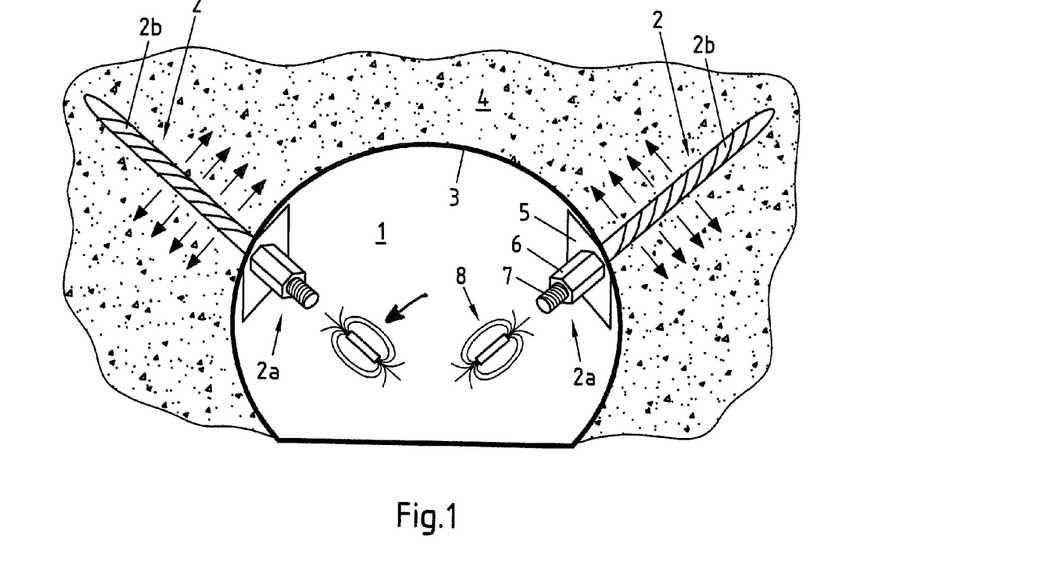
FIG. 1 shows, in a sectional view, a first exemplary embodiment of the connecting means as a rock anchor in a tunnel.

FIG. 1 shows, in a schematic sectional view, a tunnel 1 in which exemplary embodiments of the connecting means 2 according to the invention are used at least as rock anchors. To provide a positive and/or non-positive connection between the tunnel lining 3 and the rock 4 or the layers thereof, the connecting means 2 has a first region 2a which engages with the first connecting partner, in this case the tunnel lining 3, by way of a positive and/or non-positive connection. The second region 2b of the connecting means engages with the rock 4 or the layers thereof by way of a positive and/or non-positive connection. In the second region 2b of the connecting means there is provided a region composed of a preferably flat sheet-metal strip in spiral form, which, when activated, as indicated by the arrows, generates an increase in diameter, such that the region 2b of the connecting means engages firmly in the rock 4 by way of a positive and/or non-positive connection. The metal sheet of the region 2b, which metal sheet is preferably composed of a shape memory alloy and is used in the form of a shaped strip, can be produced in a simple manner by cold forming of a correspondingly shaped cut metal sheet composed of a shape memory alloy of, for example, Fe—Mn type or Fe—Mn—Si type or Fe—Mn—Si—Cr type or Fe—Mn—Si—Cr—Ni type. The cold forming has the effect, in the case of the shape memory alloy, that the latter, when activated by heating, deforms back into the original, flat shape. Enormous forces can be produced in this way, such that also, for example, the rock anchors such as are illustrated in FIG. 1 can also withstand enormous tensile forces.

To provide the positive connection with the first connecting partner, it is the case, as illustrated in FIG. 1, that a plate 5 and a nut 6 are provided as positive connecting means, which nut on a thread 7 detachably connects the positive connecting means to the connecting means 2. Also indicated in FIG. 1 are the coils 8 which are used for the inductive heating, that is to say for the introduction of an eddy current into the connecting means.

Figures 2, 3:
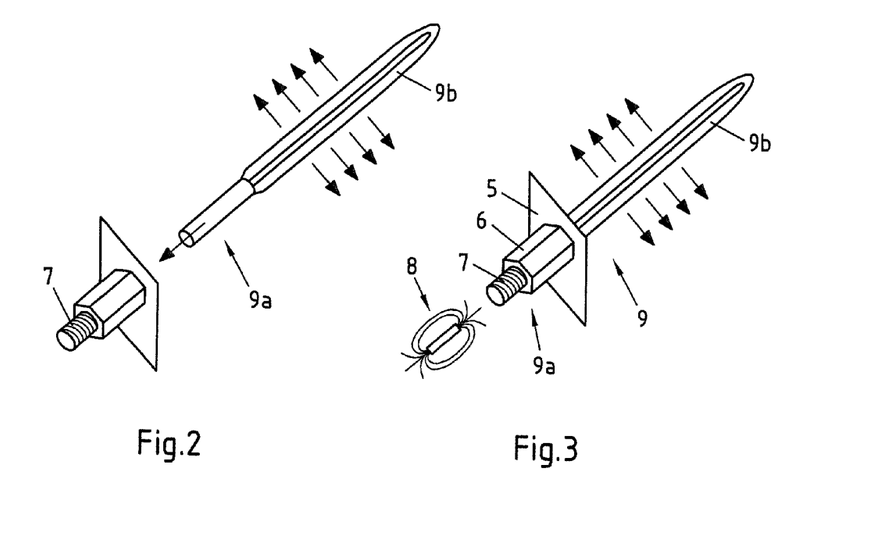
FIGS. 2, 3 show a second exemplary embodiment of the connecting means during the installation of the positive connecting means for the first connecting partner.

The connecting means 2 may be produced in one piece with the thread 7. It is however also possible for the thread 7 to be produced separately from a different material and for said thread to then be shrink-fitted onto the connecting means 9 in the first region 9a, as indicated in FIG. 2. The connecting means 9 in FIGS. 2 and 3 has, in the second region which is designed for providing the positive and/or non-positive connection with the second connecting partner, a longitudinally slotted shaped metal sheet composed of a shape memory alloy which comprises, aside from iron and inevitable impurities, the following composition in wt %:

25%≤Mn≤32%,

3%≤Si≤8%,

3%≤Cr≤6%,

Ni≤3%,

C≤0.07%, preferably 0.01%≤C≤0.07%, and/or

N≤0.07%, preferably 0.01%≤N≤0.07%, 0.1%≤Ti≤1.5% or 0.1%≤Nb≤1.5% or 0.1%≤W≤1.5%, 0.1%≤V≤1.5%.

By means of the stated composition, it is for example possible to realize superelastic behavior of the second region of the connecting means. In the case of superelastic or pseudoelastic behavior of shape memory alloys, the stretching capability can exceed that of conventional metals, for example, by at least 5 times. FIG. 3 shows, in a perspective illustration, the connecting means with assembled positive connecting means 5 including the fastening 6 and the coil 8 used to activate the shape memory alloy. The exemplary embodiment illustrated in FIGS. 2 and 3 thus has a two-part construction—the second region, which is composed of a shape memory alloy, and the first region 9a, which is provided with the thread region shrink-fitted thereon.

Figure 4:
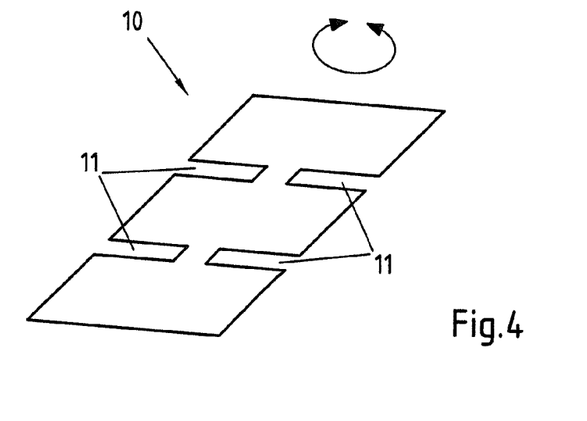
FIG. 4 shows, in an exemplary embodiment, a transversely slotted metal sheet for providing the second region of an exemplary embodiment of the connecting means.
Figure 5:
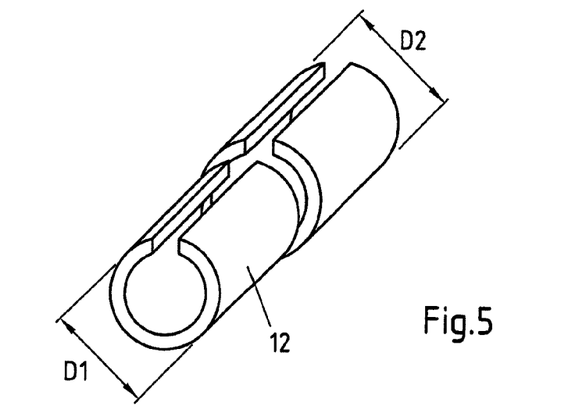
FIG. 5 shows, in a schematic, perspective illustration, the metal sheet from FIG. 4 in the shaped state as part of a second region of an exemplary embodiment of the connecting means.

FIG. 4 illustrates a metal sheet which is composed of a shape memory alloy and which has longitudinal slots 11. The metal sheet 10 from FIG. 4 is, as is correspondingly indicated by the arrows, shaped such that an elongate body divided into narrow segments is realized, which is used as second region of a connecting means. FIG. 5 shows, in a perspective illustration, a segment of the shaped metal sheet from FIG. 4. The illustrated segment of the metal sheet 10 may for example have a smaller diameter than those segments of the transversely slotted, shaped metal sheet composed of a shape memory alloy which adjoin said segment in the direction of the first region. In this way, the second region of a corresponding exemplary embodiment of the connecting means can, in the segment regions, be adapted better to the individual environmental conditions, for example broken-out rock regions, during the expansion thereof, such that improved positive and/or non-positive connection characteristics can be ensured. By means of a varying diameter, for example through the provision of a diameter which narrows toward the tip, it is for example possible to follow the typical geometries of bores.

Figure 6:
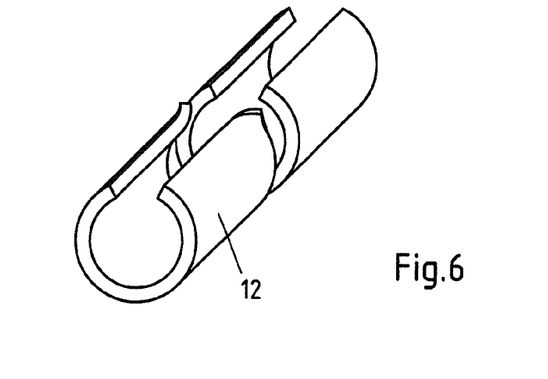
FIG. 6 shows, in a schematic, perspective illustration, the second region, illustrated in FIG. 5, of the connecting means in the not yet fully activated state.

FIG. 6 illustrates the segment 12 in the activated but not yet fully activated state. Full activation is normally realized, as already stated, by heating, wherein the additionally introduced energy results in a further deformation. Such multi-stage deformation may for example be realized through the use of different alloys in the component or sequential heating of component sections or targeted utilization of heat conduction. The deformation exhibits a considerable widening of the diameter at the boundaries to the subsequent sector in the direction of the first region of the connecting means. In this way, it is ensured that a positive connection can be easily realized, for example with a rock wall which surrounds the illustrated region of the connecting means in FIG. 6. It is easily conceivable that, in this way, improved positive connection characteristics of the connecting means are realized.

Figure 7:
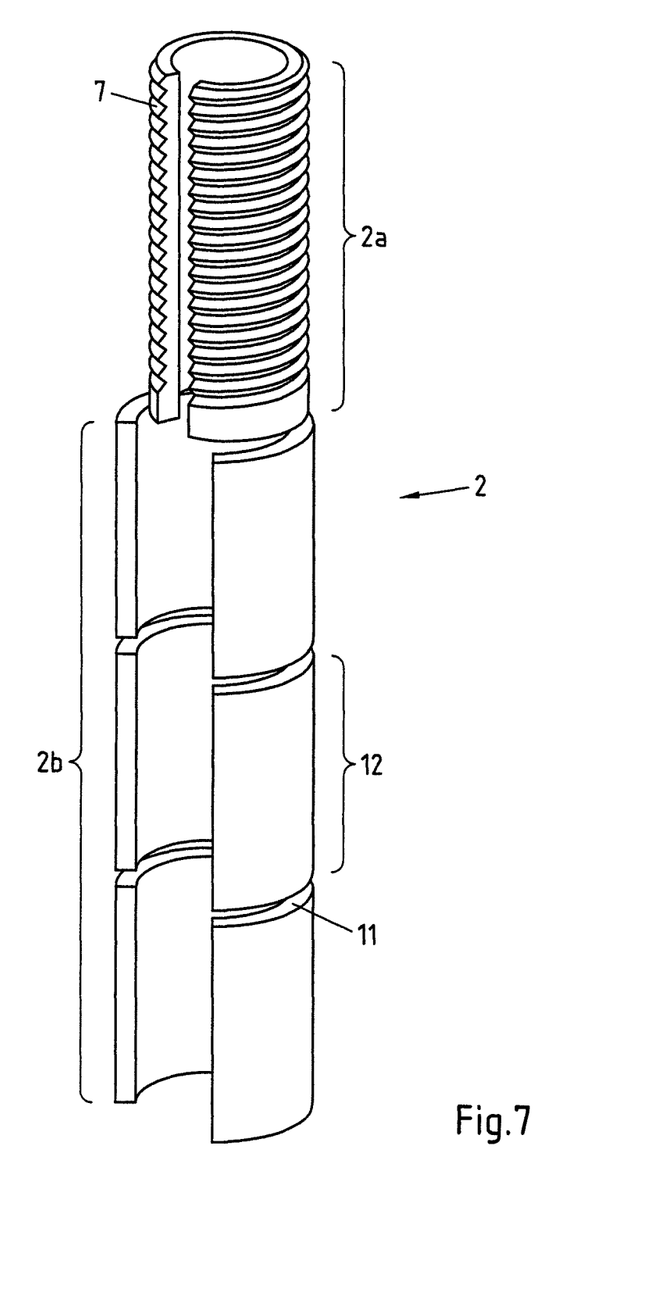
FIG. 7 shows, in a perspective illustration, the exemplary embodiment from FIG. 5 fully in the activated state.

FIG. 7 shows, in a perspective illustration, a rock anchor having a second part 2b which is composed of a shaped metal sheet made from a shape memory alloy, which second part has segments 12 which are separated by transverse slots 11. The second region 2b of the connecting means illustrated in FIG. 7 is activated and has an enlarged cross section. On the basis of FIG. 7, it is easily conceivable that the connecting means, owing to the different segments, can flexibly adapt to different cross sections of a bore and can provide a very good non-positive and/or positive connection.

Figure 8:
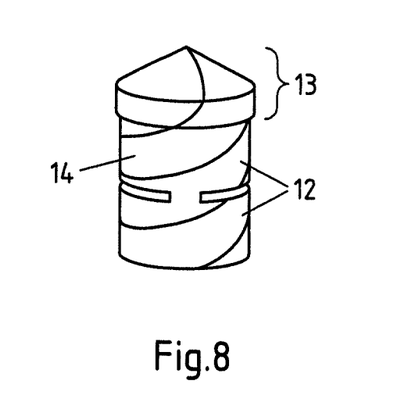
FIG. 8 shows a third exemplary embodiment of the connecting means with integrated drilling head, FIGS. 9a) to c) show a cut metal sheet provided for the second region of an exemplary embodiment, in the hot-formed, cold-formed and activated states.

The first region 2a of the connecting means 2 illustrated in FIG. 7 has a thread 7 which, in the present case, is not composed of a shape memory alloy, such that the attachment of positive connecting means is not adversely affected by the activation of the second region 2b of the connecting means. A combination of a drill and of a connecting means is shown in the exemplary embodiment schematically illustrated in FIG. 8. Adjacent to the shaped segments of a metal sheet composed of a shape memory alloy 12, the exemplary embodiment illustrated in FIG. 7 has a drilling head 13 by means of which the connecting means can be introduced for example into a second connecting partner. The impressions 14, indicated in the exemplary embodiment illustrated, of the segments 12 serve for discharging material, and improve the drilling characteristics of the connecting means with drilling capability. When the connecting means illustrated in FIG. 8 is activated, it is the case in particular that the diameter of the segments 12, which are not directly connected to the drilling head, of the second region of the connecting element is enlarged, such that said segments lead to a high-strength positive and/or non-positive connection of the connecting means with the second connecting partner, that is to say for example the rock or the layers thereof in a tunnel. For drilling tools, the iron-based shape memory alloy is particularly suitable, as it has a higher activation temperature than other shape memory alloys, and thus the risk of inadvertent premature activation is minimized.

Figure 9A:
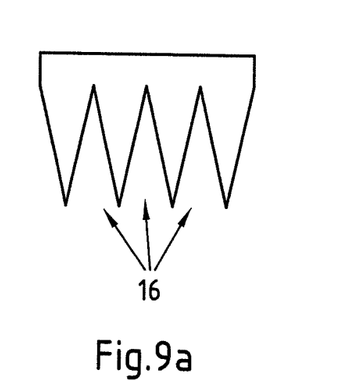
Figure 9B:
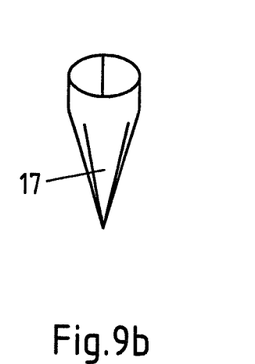
Figure 9C:
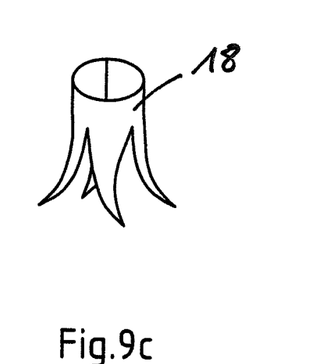

FIG. 9 illustrates, in the form of sketches, the changes in shape that can be realized using materials with shape memory. For example, FIG. 9a) shows a plan view of a metal sheet 15 with triangular longitudinal slots. The metal sheet 15 may then, for example as illustrated in FIG. 9b), be deformed by cold forming to form a conical tip 17, which then, in the activated state as illustrated in FIG. 9c), has spread-out arms which can then for example dig into soft ground, such that the conical tip, in an activated state, serves as an anchor. In this way, a positive and/or non-positive connection is also possible even in soft ground.

Figure 10:
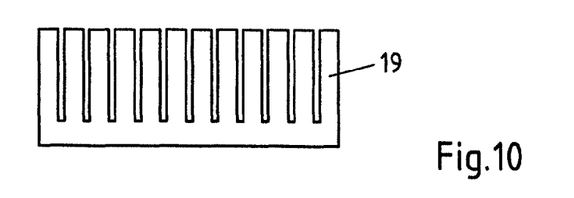
FIG. 10 shows, in a plan view, a longitudinally slotted metal sheet for use in a further exemplary embodiment of the connecting means, FIGS. 11 a), b) show, in a schematic sectional view, an exemplary embodiment which uses the metal sheet from FIG. 10 and which is in the form of a ground fastening anchor.
Figure 11A:
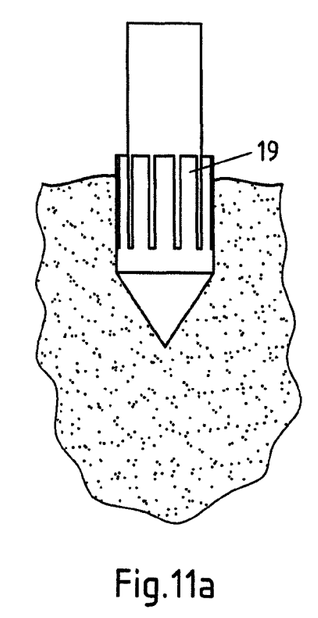
Figure 11B:
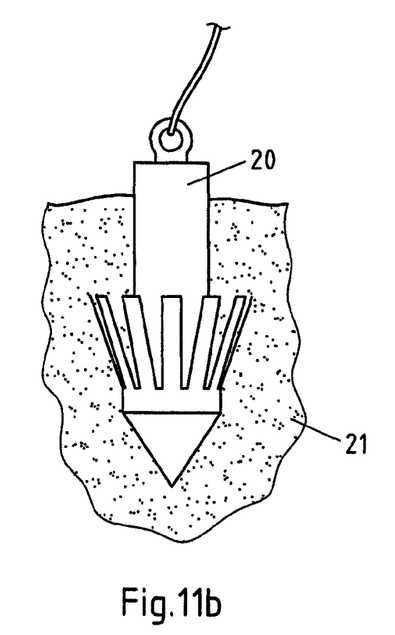

For usage, this may also be realized in a reversed form. For this purpose, FIG. 10 illustrates a longitudinally slotted metal sheet 19 which is deformed by cold forming to form a tubular body which is arranged, with the slot openings upward, on a connecting means 20. A connecting means 20 of said type is introduced into the ground of a water, for example into the sea ground 21, as illustrated in FIG. 11a). When activated, the individual lugs of the metal sheet 19 spread out, giving rise to a self-locking action of the connecting means 20 in the sea ground (FIG. 11b)). In this case, a drilling platform or a floating wind turbine (not illustrated here) are conceivable as a second connecting partner.

Figure 12:
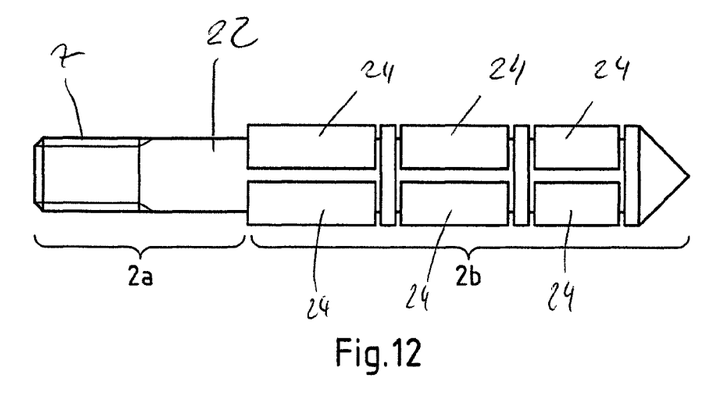
FIG. 12 shows an exemplary embodiment of the connecting means composed of different materials.

FIG. 12 illustrates a fixing anchor which is of cohesive configuration and which has a continuous pin 22 and, at the end of the second region 2b, a tip 23 for driving into a bore, for example. At the opposite end, in the first region 2a, there is provided a thread 7 for receiving a nut. For example, the pin 22 is manufactured from conventional steel. The second region 2b of the pin is connected to multiple means 24 for providing the positive and/or non-positive connection, said means being produced from at least partially flat materials with shape memory characteristics. Shape memory alloys are preferably used as materials, with use being made of metal sheets which are produced from the alloys and subsequently deformed. In principle, it is however also possible for other shape memory materials to be used here.

Aside from the uses illustrated in FIGS. 1 to 12, it is easily possible for the connecting means also to be used as an excavation support, plug or fixing and installation anchor. For this purpose, it is merely necessary for the characteristics provided by the connecting means, a positive and/or non-positive connection with a connecting partner by way of a rolled material with shape memory, and a positive and/or non-positive connection with the second connecting partner by way of the first region, to be provided. The illustrated exemplary embodiments can be readily adapted to the stated uses. It is also conceivable for activation of the shape memory to be realized by way of other mechanisms, for example magnetic activation of the shape memory.

The invention claimed is:

1. A connector for providing a positive and/or a non-positive connection between at least two connecting partners comprising at least one first region which engages with a first connecting partner by way of a positive and/or a non-positive connection, and at least one second region which engages with at least a second connecting partner by way of a positive and/or a non-positive connection, wherein at least the second region of the connector has a region which is initially formed from an at least partially flat shaped metal sheet that is subsequently formed into a tubular shape comprising an iron alloy with shape memory characteristics and which, when activated, provides the positive and/or non-positive connection with the second connecting partner by way of a change of the tubular shape; and wherein the at least one second region of the connector defines a longitudinal slot and at least one transverse slot when the shaped metal sheet is activated.

2. The connector as claimed in claim 1, wherein, as shape memory alloy, use is made of a Fe—Mn alloy, Fe—Mn—Si alloy, a Fe—Mn—Si—Cr alloy or a Fe—Mn—Si—Cr—Ni alloy.

3. The connector as claimed in claim 1, wherein the shape memory alloy comprises, aside from iron and inevitable impurities, the following alloy elements in wt %:

12%≤Mn≤45%,

1%≤Si≤10%,

Cr≤20%,

Ni≤20%,

Mo≤20%,

Cu≤20%,

Co≤20%,

Al≤10%,

Mg≤10%,

Ti≤2%,

Nb≤2%,

W≤2%,

C≤1%,

N≤51%,

P≤0.3%,

Zr≤0.3%,

B≤0.01%.

4. The connector as claimed in claim 1, wherein the shape memory alloy comprises, aside from iron and inevitable impurities, the following alloy elements in wt %:

25%≤Mn≤32%,

3%≤Si≤8%,

3%≤Cr≤6%,

Ni≤3%,

C≤0.07%, preferably 0.01%≤C≤0.07%, and/or

N≤0.07%, preferably 0.01%≤N≤0.07%, 0.1%≤Ti≤1.5%

0.1%≤Nb≤1.5% or 0.1%≤W≤1.5%

0.1%≤V≤1.5%.

5. The connector as claimed in claim 1, wherein, in the at least one first region of the connector, there are provided positive connecting elements for forming a positive connection with the first connecting partner.

6. The connector as claimed in claim 5, wherein the positive connecting elements are detachably connected to the at least one first region of the connector, and wherein, in the at least one first region of the connector, there is provided a thread for detachable fastening of the positive connecting elements.

7. The connector as claimed in claim 1, wherein the at least one second region of the connector has a tip generated as a result of cutting of the shaped metal sheet.

8. A connector for providing a positive and/or a non-positive connection between at least two connecting partners comprising at least one first region which engages with a first connecting partner by way of a positive and/or a non-positive connection, and at least one second region which engages with at least a second connecting partner by way of a positive and/or a non-positive connection, wherein at least the second region of the connector has a region which is initially formed from an at least partially flat shaped metal sheet that is subsequently formed into a tubular shape comprising an iron alloy with shape memory characteristics and which, when activated, provides the positive and/or non-positive connection with the second connecting partner by way of a change of the tubular shape; and wherein the at least one second region of the connector has an end in the form of a cutting tip or drilling head, and the at least one second region at least partially has profilings for discharging material.

9. The connector as claimed in claim 1, wherein the at least one second region of the connector is formed by a longitudinally slotted shaped metal sheet comprised of a shape memory alloy.

10. The connector as claimed in claim 9, wherein the longitudinal slot of the shaped metal sheet is of triangular form and the shaped metal sheet is cold-formed to form a conical tip.

11. The connector as claimed in claim 1, wherein the connector is one of a rock anchor, a rock bolt, an excavation support, a plug, a fixing and installation anchor, and a ground fastening anchor.

* * * * *